United States Patent [19]

Runkle

[11] 4,362,086

[45] Dec. 7, 1982

[54] PRESSURE LIMITER FOR HYDRAULIC BRAKE BOOSTER

[75] Inventor: Dean E. Runkle, LaPorte, Ind.

[73] Assignee: The Bendix Corporation, Southfield, Mich.

[21] Appl. No.: 168,972

[22] Filed: Jul. 14, 1980

Related U.S. Application Data

[63] Continuation of Ser. No. 936,271, Aug. 23, 1978, abandoned.

[51] Int. Cl.³ ............................ F15B 0/42; F15B 13/14
[52] U.S. Cl. .................................... 91/391 R; 91/434; 60/547 A; 60/547 B
[58] Field of Search ............................ 91/434, 391 R; 60/547 A, 547 B, 552, 553; 251/20, 77; 137/625.68

[56] References Cited

U.S. PATENT DOCUMENTS

| | | | |
|---|---|---|---|
| 2,608,263 | 8/1952 | Garrison | 91/434 |
| 2,766,732 | 10/1956 | Schultz | 91/384 X |
| 2,882,867 | 4/1959 | Thompson | 91/434 X |
| 2,968,316 | 1/1961 | Schultz | 91/434 X |
| 3,054,386 | 9/1962 | Bohnhoff | 91/434 X |
| 3,099,282 | 7/1963 | Miller et al. | 251/20 X |
| 3,603,209 | 9/1971 | MacDuff | 91/391 R |
| 3,688,498 | 9/1972 | Bach et al. | 91/391 R |
| 3,724,332 | 4/1973 | Bach | 91/391 R |
| 3,728,942 | 4/1973 | Brown, Jr. | 91/391 R |
| 3,805,671 | 5/1974 | Carre | 91/391 |
| 3,845,693 | 11/1974 | Meyers | 60/548 |
| 4,154,059 | 5/1979 | Bach et al. | 91/391 R |
| 4,250,795 | 2/1981 | Martinic | 137/625.68 X |

FOREIGN PATENT DOCUMENTS 2332445 6/1977 France .

*Primary Examiner*—George L. Walton
*Attorney, Agent, or Firm*—Paul David Schoenle; Ken C. Decker

[57] ABSTRACT

The present invention relates to an improvement in a hydraulic brake booster, and in particular, covers a structure which provides a pressure limiter for the hydraulic brake booster. The booster comprises a housing which defines a pressure chamber and supports a control valve and a piston. During braking the control valve cooperates with an actuator to move relative to the housing so as to communicate pressurized fluid to the pressure chamber and the piston is movable in response to the pressurized fluid within the pressure chamber to effectuate braking. In order to limit the level of pressure of pressurized fluid communicated to the pressure chamber a ring is disposed within the housing in cooperation with the control valve. The ring cooperates with the control valve to define a differential area which is exposed to pressurized fluid to generate a force opposing movement of the control valve so that communication of pressurized fluid to the pressure chamber is limited. In a preferred embodiment the ring is integrally formed with a sleeve to form a differential area responsive to the pressurized fluid communicated to the pressure chamber and the sleeve cooperates with a resilient member to bias the control valve to a non-braking position.

1 Claim, 3 Drawing Figures

PRESSURE LIMITER FOR HYDRAULIC BRAKE BOOSTER

This is a continuation of application Ser. No. 936,271, filed Aug. 23, 1978, now abandoned.

BACKGROUND OF THE INVENTION

As evidenced by U.S. Pat. Nos. 3,724,332 and 3,728,942, it is known that the movement of a spool valve in a hydraulic brake booster can be limited so as to provide a pressure limiter for the pressurized fluid within a pressure chamber. The control valve is movable within a bore in the housing to open an inlet port to the pressure chamber while at the same time closing an outlet port so that pressurized fluid communicated to the pressure chamber is increased. If the level of pressure within the pressure chamber reaches a predetermined value, the pressure limiter is activated to prohibit further increases in the pressure level.

SUMMARY OF THE INVENTION

The present invention relates to an improvement in a pressure limiter for a hydraulic brake booster. The brake booster includes a housing which movably supports a control valve and substantially defines a pressure chamber. An actuator resiliently cooperates with the control valve to impart movement to the latter upon operator demand so that pressurized fluid is communicated to the pressure chamber. A pressure responsive element moves in response to the pressurized fluid within the pressure chamber to effectuate braking. In accordance with the invention the housing also movably supports a ring which cooperates with the control valve to define a differential area in communication with the pressurized fluid within the pressure chamber. More specifically, the control valve and ring are movably disposed within a stepped bore in the housing with the control valve being positioned in a small diameter portion and the ring being positioned in a large diameter portion. The control valve is engageable with the ring so that the pressure acting against the ring and control valve generates a larger force in one direction than the pressure acting against the control valve generates in the other direction. As a result, increasing levels of pressure within the pressure chamber create larger forces urging the ring and control valve to move in one direction until the force in the one direction is substantially equal to and opposite the force applied by the actuator coupled with the other direction force. With the forces on the control valve being substantially equal and opposite, the control valve is fixed axially relative to the housing so as to prevent further increases in communication of pressurized fluid to the pressure chamber, therefore, a maximum pressure level is set.

Preferably, the ring is integrally formed with a sleeve and a resilient member cooperates with the sleeve to bias the ring into engagement with the control valve. Moreover, the ring is exposed to pressurized fluid on both sides thereof, until the control valve is moved to a position to close an outlet port at which time the ring is exposed to pressurized fluid on one side so as to bias the ring toward the control valve.

An alternative embodiment provides a sealing ring which is disposed between the sleeve and control valve but separate therefrom.

It is an object of the present invention to provide a pressure or travel limiter in a hydraulic brake booster which is simple to integrate into a prior art booster.

DETAILED DESCRIPTION

Figure 1:
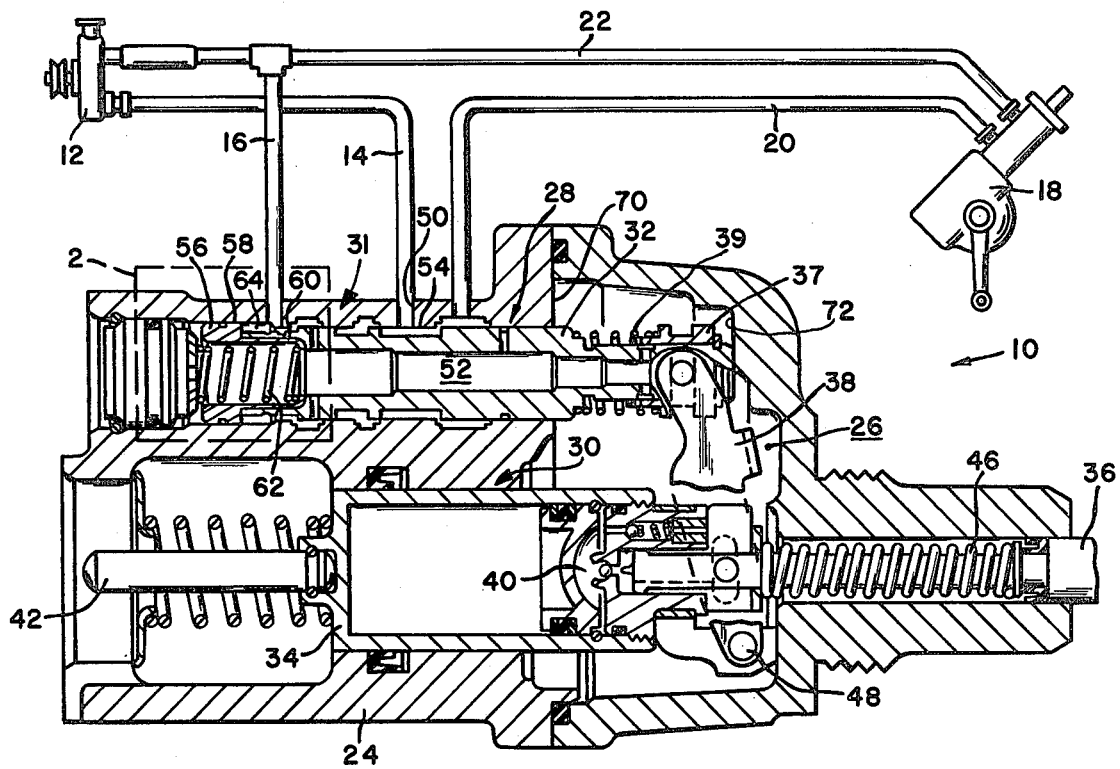
FIG. 1 is a schematic view of a hydraulic braking system showing a hydraulic brake booster in cross section and constructed in accordance with the present invention.

The hydraulic brake system of FIG. 1 includes a hydraulic brake booster 10 which is in communication with a pressure source 12, such as a power steering pump, via inlet conduit 14 while a vent conduit 16 communicates the booster 10 with a reservoir in the pressure source 12. The system also includes a steering gear 18 communicating with the booster 10 via an outlet conduit 20 and with the reservoir of the pressure source 12 via conduit 22.

The hydraulic brake booster 10 includes a housing 24 which substantially defines a pressure chamber 26, while a pair of bores at 28 and 30 movably support a control valve 32 and piston 34, respectively. Extending into the housing 24 is an input rod 36 which cooperates with a lever 38 to impart movement to the control valve 32, via a cap 37 and a spring 39. The rod 36 also opposes the piston 34 to impart manual travel to the piston should the hydraulic system fail to provide a power assist as explained hereinafter. The piston 34 defines and encloses a storage chamber 40 and a link 42 extending from the piston 34, is coupled to a master cylinder (not shown).

A resilient member or spring 46 is carried by the input rod 36 to resiliently pivot lever 38 about pin 48 so as to impart travel to the control valve 32. During braking an inlet port 50 communicates with a passage 52 in the control valve as the latter is moved to the left to communicate pressurized fluid to the pressure chamber 26. The piston 34 is movable in response to the pressurized fluid within the pressure chamber 26 to actuate the master cylinder, thereby effectuating braking with a power assist from the pressurized fluid within the pressure chamber 26.

Figure 2:
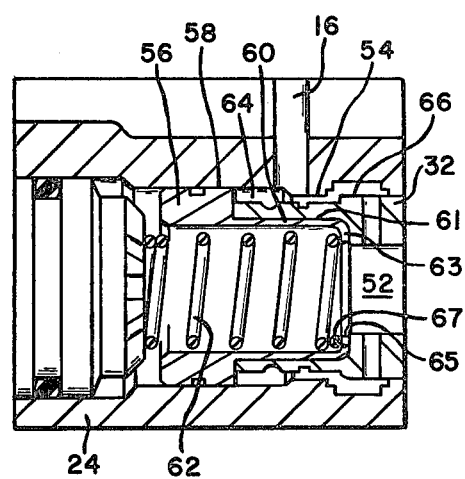
FIG. 2 is an enlarged view of the encircled portion of FIG. 1.

In accordance with the invention, the bore 28 is stepped to movably receive a valve assembly 31 comprising the control valve 32 and a ring 56, the control valve 32 being substantially disposed within a small diameter portion 54 and the ring 56 being slidably disposed within a large diameter portion 58. Turning to FIG. 2, the ring 56 is integrally formed with a sleeve 60 and a spring 62 biases the sleeve 60 and ring 56 toward the control valve 32. Upon inspection of FIG. 1, it will be seen that the spring 62 biases the control valve assembly 31 to the right against an abutment 72 defined by the housing 24. The engagement of control valve assembly 31 with the abutment 72 defines a rest position for the control valve assembly. The sleeve 60 is disposed within a bore 61 on the control valve 32 and a flange 63 abuts a shoulder 67 and opposes the spring 62. The left end of the control valve 32 extends into the large diameter portion 58 and forms a cavity 64 therewith. The cavity 64 communicates with the return conduit 16 when the control valve is in its rest position to expose the right side of the ring to fluid having a pressure substantially the same as the pressure in the reservoir of the pressure source 12 via the return line 16 connected thereto. The control valve 32 and ring 56 cooperate to define a differential area which is related to the difference in diameters between the portions 54 and 58. Those skilled in the art will recognize that the right end of the control valve 32 defines a first area which is exposed to the fluid pressure in pressure chamber 26. Likewise, the ring 56 defines a second area which is also exposed to the pressure in chamber 26. The area defined by the ring 56 is larger than the area defined by control valve 32 according to the diameters of the bore portions 58 and 54. The right side of ring 56 defines a third area equal to the difference between the first and second areas. The third area is exposed to the fluid pressure in the return line 16.

When the control valve 32 is initially moved to the left away from its rest position, responsive to leftward movement of the input rod 36, pressurized fluid is communicated to the pressure chamber 26 via passage 52. The preload on spring 39 is greater than the preload on spring 62 so that the leftward movement of the cap 37 caused by pivotal movement of the lever 38 results in leftward movement of the valve assembly 31 without contraction of the spring 39. The same pressurized fluid is communicated to the left end of the valve assembly 31 via an opening 65 on the sleeve 60 to react against the ring 56. A land 66 of the control valve 32 cooperates with the small diameter portion 54 to close communication between the passage 52 and the return conduit 16. The cavity 64 is vented to the return. As a result, the same pressure applied across the ring 56 in the larger diameter portion 58 will create a larger force than that pressure applied across the control valve in the smaller diameter portion. With the ring 56 in engagement with the control valve the resulting force on the control valve will be sufficient to oppose further movement of the control valve to the left in response to movement of the input rod 36 when the pressure of the pressurized fluid reaches a predetermined value. When the predetermined pressure is reached in pressure chamber 26, the fluid pressure on ring 56 plus the force of spring 62 balances the fluid pressure on the control valve 32 plus the force of spring 39. Further leftward movement of the cap 37 contracts the spring 39 and slides the cap 37 leftward along the control valve 32. Consequently, further opening of the inlet port 50 will be prevented.

By varying the spring constants of the springs 46, 39 and 62 and the diameters of portion 54 and 58, it is possible to set a maximum pressure level for the pressure chamber to prevent pressure increases above the maximum predetermined pressure level.

Figure 3:
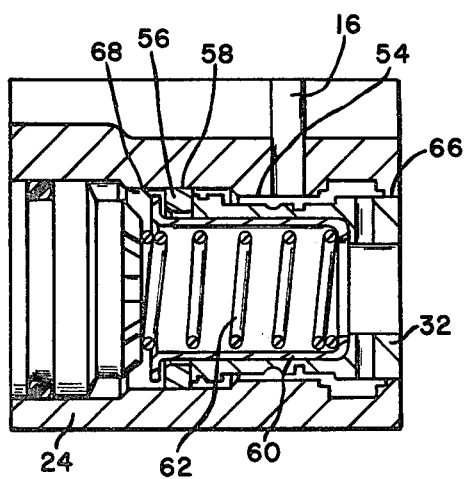
FIG. 3 is an enlarged view similar to FIG. 2, but showing an alternative embodiment.

Turning to FIG. 3, the ring 56 is separate from the sleeve 60 and the latter is provided with a radially outwardly extending flange 68 to trap the ring between the left end of the control valve 32 and the flange 68. Although not shown, it is possible to use an O-Ring for the ring 56.

In both embodiments, the same pressurized fluid, which is communicated to the pressure chamber, is also utilized to react against a differential area between the ring and the control valve in order to offset further movement of the control valve when the pressurized fluid reaches a predetermined value.

Although the ring 56 cooperates with the control valve to limit the travel of the latter, the ring 56 is pressure responsive so that the differential area defined between the ring 56 and the control valve 32 acts to limit the pressure level within the pressure chamber 26.

In addition it is possible to provide a skirt (not shown) on the cap 37 which would be engageable with the wall 70 of the housing after a predetermined travel for the cap so that the differential area between the ring and control valve would be a function of the spring constants for springs 62 and 39. As a result the differential area could be set independently of the spring 46.

Moreover, if the maximum pressure level is reached in the pressure chamber so that the differential acts to prevent further opening of the inlet port 50 and the piston 34 fails to move due to friction or sticking, the input rod 36 is capable of further movement to contract the spring 46 and impart manual movement to the piston 34.

The appended claims are intended to cover not only the embodiments illustrated in the drawings, but also all modifications and/or variations which are feasible by one skilled in the art.

I claim:

1. A hydraulic brake booster having a housing with a pair of bores therein, said bores communicating with a pressure chamber, a pressure responsive piston slidably received in one of said bores, said piston cooperating with means for effecting a brake application responsive to movement of said piston; an inlet, an outlet and a vent port all communicating with the other of said bores for communicating pressurized fluid through said housing, said other bore being stepped to provide a small diameter portion and a large diameter portion, a pressure responsive valve member slidably received in said small diameter portion, said valve member being movable relative to said housing between a first position in which said valve member communicates said inlet with said outlet and closes communication from said inlet to said pressure chamber while communicating said vent port with said pressure chamber and a second position in which said valve member restricts communication between said inlet and outlet and opens communication from said inlet to said pressure chamber while closing communication between said pressure chamber and said vent port, a ring member slidably received in said large diameter portion and cooperating with said valve member to define an annular chamber radially disposed between said valve member and said large diameter portion and communicating with said vent port, said ring member defining a first area which is exposed to said annular chamber and a second oppositely disposed area which is exposed to said pressure chamber, said vent port providing communication with said annular chamber, yieldable resilient input means for moving said valve member from said first position toward said second position, said ring member producing a force opposing movement of said valve member toward said second position responsive to the pressure differential between pressurized fluid in said pressure chamber acting on said second area and vent port pressure in said annular chamber acting on said first area, said input means yielding responsive to said force at a predetermined pressure differential to prevent further communication of pressurized fluid to said pressure chamber and said vent port intersecting said other bore substantially at an axial intersection between said small and large diameter portions to remain continuously open to said annular chamber in all positions of said pressure responsive valve member during the brake application.

* * * * *